United States Patent
Kumazawa et al.

(10) Patent No.: US 7,311,638 B2
(45) Date of Patent: Dec. 25, 2007

(54) MECHANICAL AUTOMATIC TRANSMISSION APPARATUS

(75) Inventors: Atsushi Kumazawa, Tokyo (JP); Tsuyoshi Asano, Tokyo (JP)

(73) Assignee: Mitsubishi Fuso Truck and Bus Corporation (JP)

( * ) Notice: Subject to any disclaimer, the term of this patent is extended or adjusted under 35 U.S.C. 154(b) by 226 days.

(21) Appl. No.: 11/268,672

(22) Filed: Nov. 7, 2005

(65) Prior Publication Data

US 2006/0116239 A1 Jun. 1, 2006

(30) Foreign Application Priority Data

Nov. 5, 2004 (JP) ............... 2004-322371

(51) Int. Cl.
B60W 10/02 (2006.01)
(52) U.S. Cl. ............ 477/177; 475/79; 475/97; 701/55; 701/65; 701/67
(58) Field of Classification Search ............ 477/79, 477/97, 174, 177; 701/51, 55, 65, 67
See application file for complete search history.

(56) References Cited

U.S. PATENT DOCUMENTS

| | | | |
|---|---|---|---|
| 4,497,222 A | * | 2/1985 | Nagaoka et al. ............ 477/124 |
| 4,850,249 A | * | 7/1989 | Kirstein .................... 477/97 |
| 6,929,580 B2 | * | 8/2005 | Frotscher ................... 477/76 |
| 7,058,498 B2 | * | 6/2006 | Kano et al. ................. 701/67 |

FOREIGN PATENT DOCUMENTS

JP 11-321386 A 11/1999

* cited by examiner

*Primary Examiner*—Ha D. Ho
(74) *Attorney, Agent, or Firm*—Rossi, Kimms & McDowell LLP

(57) ABSTRACT

During a period in which a clutch is in a partially engaged state at the time of start of a vehicle, a transmission ECU calculates load acting on the clutch (clutch-absorbed energy). When this load is large, generation of a shift signal based on a gear shift map is prohibited, and the initial gear position is held. The clutch-absorbed energy is obtained through integration of the product of clutch transmission torque and the difference between rotational speed of an engine and rotational speed of the clutch. The clutch transmission torque is determined with reference to a clutch transmission torque map provided in the transmission ECU.

3 Claims, 6 Drawing Sheets

MECHANICAL AUTOMATIC TRANSMISSION APPARATUS

BACKGROUND OF THE INVENTION

1. Field of the Invention

The present invention relates to a mechanical automatic transmission apparatus for a vehicle which prohibits upshift and maintains a gear position, when running resistance at the time of start of the vehicle is large, to thereby prevent acceleration failure and downshift because of a drop in vehicle speed.

2. Description of the Related Art

In recent years, mechanical automatic transmissions in which actuators are added to a transmission gear mechanism and a clutch mechanism, which are similar to those used in manual-transmission vehicles, in order to enable automatic gear shift have been developed and put into practice, and applied mainly to large-sized vehicles such as trucks and buses.

In such a mechanical automatic transmission, in general, gear-shift control is performed on the basis of a gear-shift map as shown in FIG. 6. Specifically, upshift and downshift are performed on the basis of accelerator opening information and vehicle speed information.

For example, at the time of start, as shown in the gear-shift map of FIG. 6, the gear position is automatically shifted from 1st to 2nd when the vehicle speed reaches about 10-plus km/h, from 2nd to 3rd when the vehicle speed reaches about 20-plus km/h, and from 3rd to 4th when the vehicle speed reaches about 40 km/h. Each of the vehicle speeds for automatic upshift is shifted toward a higher speed as the accelerator opening increases.

However, when automatic shift control is performed on the basis of such a gear-shift map, a problem may arise when the vehicle starts with a large running resistance acting thereon; i.e., when the vehicle is on a steep uphill or carries a heavy load. That is, in the case where automatic shift control is performed by use of a gear-shift map, even when the vehicle is on a steep uphill or carries a heavy load, upshift control is automatically performed at a constant vehicle speed; e.g., upshift from 1st to 2nd is performed when the vehicle speed reaches 10-plus km/h, and upshift from 2nd to 3rd is performed when the vehicle speed reaches 20-plus km/h. However, in such a case, because of a large running resistance, drive force after upshift becomes insufficient, and the vehicle cannot be accelerated to a sufficient degree, so that a hunting phenomenon associated with gear position occurs in which the vehicle speed decreases and downshift is performed, and then upshift is again performed as a result of an increase in the vehicle speed.

A conceivable method for solving such a problem is estimating running resistance from acceleration and engine torque during traveling, and prohibiting upshift after start. According to this method, running resistance cannot be calculated unless the vehicle travels a certain distance or more after the start. Therefore, even in the case where upshift is desired to be prohibited immediately after the start, upshift may be performed because running resistance is calculated too late, and the above-described problem may occur.

SUMMARY OF THE INVENTION

In view of the foregoing, an object of the present invention is to provide a mechanical automatic transmission apparatus which estimates running resistance immediately after start of a vehicle and prohibits upshift when the running resistance after the start is large, to thereby enable smooth start.

In order to achieve the above-described object, the present invention provides a mechanical automatic transmission apparatus for a vehicle comprising an engine; a transmission for outputting drive force to an output system of the vehicle; a clutch interposed between the engine and the transmission and selectively transmitting drive force from the engine to the transmission; an operating condition detection element for detecting operating conditions of the vehicle; a gear shift map storing target gear positions determined on the basis of the operating conditions of the vehicle; a gear shift control element for activating the clutch and the transmission so as to perform gear shift, when a different target gear position is selected from the gear shift map on the basis of the operating conditions of the vehicle detected by the operating condition detection element; a clutch load detection element for detecting load acting on the clutch; and a running resistance estimation element for estimating running resistance (inclination of road, quantity of a carried load) acting on the vehicle at the time of start of the vehicle from the load which acts on the clutch during a partially engaged period after start of the vehicle and which is detected by the clutch load detection element. The gear shift control element prohibits gear shift and holds an initial gear position when the running resistance estimated by the running resistance estimation element is greater than a predetermined value.

Since running resistance is estimated from load acting on the clutch during a partially engaged period after start of the vehicle, estimation of running resistance immediately after start becomes possible without requiring dedicated means, such as sensors, for detecting running resistance, and when the running resistance immediately after start is large, the gear position can be held for a predetermined period of time through prohibition of upshift.

By virtue of the above, gear position hunting at the time of start can be prevented whereby deterioration in drive feeling can be prevented.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which.

DESCRIPTION OF THE PREFERRED EMBODIMENT

An embodiment of the present invention will be described in detail with reference to the drawings.

Figure 1:
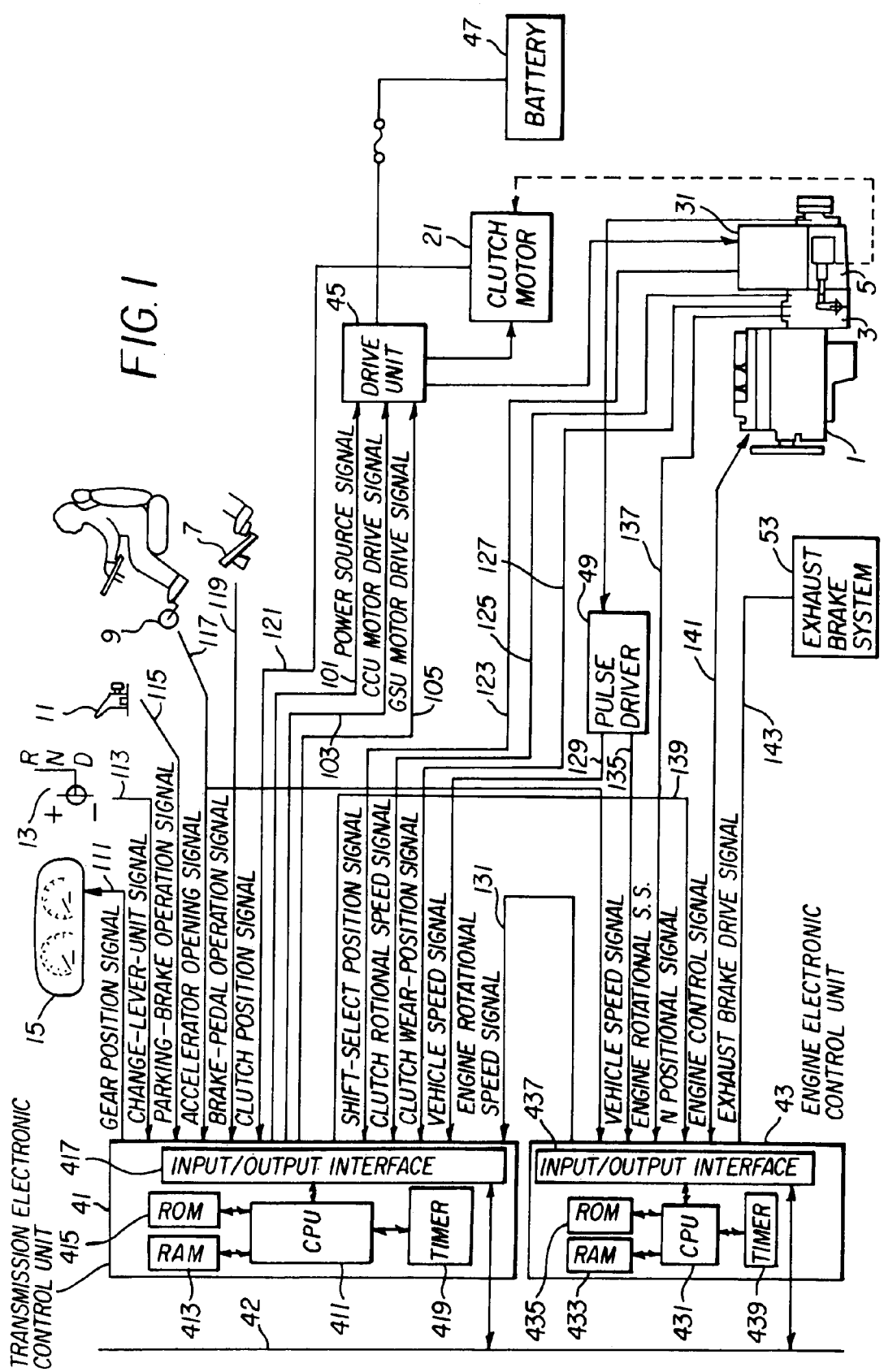
FIG. 1 is a diagram showing the configuration of a mechanical automatic transmission apparatus according to an embodiment of the present invention.

First, the configuration of a mechanical automatic transmission apparatus according to the present embodiment will be described with reference to FIG. 1. An engine 1 comprises a clutch mechanism 3 including a friction clutch; and a mechanical automatic transmission mechanism 5 connected to an output shaft of the engine 1 via the clutch mechanism 3. A clutch motor (CCU) 21, serving as a clutch actuator, is connected to the clutch mechanism 3. The clutch 3 is brought into an engaged or disengaged state through activation of the clutch motor 21.

The mechanical automatic transmission mechanism 5 is driven by means of a gear-shift motor (GSU) 31 so as to perform gear-shift operation. The gear-shift motor 31 is composed of two motors for driving two gear shift members which are provided in the mechanical automatic transmission mechanism 5 and are movable in a select direction and a shift direction, respectively. At the time of gear shift, the gear shift members are moved by means of the gear-shift motor 31 so as to switch the gear engagement condition of the mechanical automatic transmission mechanism 5, whereby the gear position is shifted as desired.

The engine 1 is controlled by means of an engine control signal 141 output from an engine electronic control unit (engine ECU) 43. The engine ECU 43 includes a central processing unit (CPU) 431, which executes computation processing in accordance with control programs; read-only memory (ROM) 435 for storing the control programs, and the like; random access memory (RAM) 433 for storing computation results and other data; an input/output interface 437; a timer 439; and other necessary components. The engine ECU 43 generates the engine control signal 141 and an exhaust brake drive signal 143 for driving an exhaust brake system 53.

The engine ECU 43 receives a vehicle speed signal 135 output from a vehicle speed sensor provided on the output side of the mechanical automatic transmission mechanism 5; an engine rotational speed signal 137 indicative of rotational speed of the engine 1; an accelerator opening signal 117 output from an accelerator depression amount sensor attached to an accelerator pedal 9; an N position signal 139 indicating that the mechanical automatic transmission mechanism 5 is in a neutral state; etc. These signals are input to the engine ECU 43 via the input/output interface 437. For example, the accelerator opening signal 117, the voltage of which changes in accordance with the amount by which the accelerator pedal 9 is depressed by a driver, is converted to digital data by means of AD conversion, and the thus-obtained digital data are input to the engine ECU 43.

The clutch motor 21 and the gear-shift motor 31 are driven by means of control signals output from a transmission electronic control unit (transmission ECU) 41. Similar to the engine ECU 43, the transmission ECU 41 includes a central processing unit (CPU) 411, which executes computation processing in accordance with control programs; read-only memory (ROM) 415 for storing the control programs, including an engine output control program to be described later, an engine output map to be described later, and the like; random access memory (RAM) 413 for storing computation results and other data; an input/output interface 417; a timer 419; and other necessary components.

The transmission ECU 41 receives, via the input/output interface 417, a change-lever-unit signal 113, which is an operation signal of a change lever unit 13; a parking-brake operation signal 115, which becomes an ON level when a parking brake 11 is pulled, so as to indicate activation of the parking brake; the above-mentioned accelerator opening signal 117; a brake-pedal operation signal 119, which becomes an ON level when a brake pedal 7 is depressed, so as to indicate activation of the brake; a clutch position signal 121 output from the clutch motor 21; a shift-select position signal 123 output from the gear-shift motor 31; a clutch rotational speed signal 125 indicative of output-side rotational speed of the clutch mechanism 3; a clutch wear-position signal 127 indicative of clutch wear and position detected at the clutch mechanism 3; a vehicle speed signal 129 output from a vehicle speed sensor provided on the output side of the mechanical automatic transmission mechanism 5; an engine rotational speed signal 131 indicative of rotational speed of the engine 1; etc.

The transmission ECU 41 processes these input signals, and outputs, via the input/output interface 417, a power source signal 101 and drive signals (a CCU motor drive signal 103 and a GSU motor drive signal 105) for driving the clutch motor 21 and the gear-shift motor 31. The transmission ECU 41 also outputs to an indicator 15 a gear position signal 111 indicative of the gear position of the mechanical automatic transmission mechanism 5. The CCU motor drive signal 103, the GSU motor drive signal 105, and the power source signal 101 output from the transmission ECU 41 are fed to a drive unit 45, which is a power circuit. The drive unit 45, which is connected to a battery 47, applies voltage to the clutch motor 21 in accordance with the CCU motor drive signal 103, and also applies voltage to the gear-shift motor 31 in accordance with the GSU motor drive signal 105.

The transmission ECU 41, the engine ECU 43, and other, unillustrated electronic control units are connected to a bus 42 for mutual signal exchange.

The driver can drive the vehicle while selecting an automatic shift mode or a manual shift mode by use of the change lever unit 13. That is, when the driver brings the lever of the change lever unit 13 to a drive "D" position, the transmission ECU 41 controls the clutch motor 21 and the gear-shift motor 31 so as to shift the gear position to an optimum gear position on the basis of input signals indicative of various running conditions (e.g., vehicle speed and engine load) of the vehicle (automatic shift mode). At this time, the engine ECU 43 controls engine output, etc. in accordance with the shift signal fed from the transmission ECU 41 via the bus 42, the engine rotational speed signal 137, etc.

Meanwhile, the driver can manually shift the gear position. When the driver brings the lever of the change lever unit 13 to a "+" position or a "−" position, the changer lever operation signal 113 is fed to the transmission ECU 41 so as to instruct one-step upshift or one-step downshift from the present gear position. In response to this signal, the transmission ECU 41 controls the clutch motor 21 and the gear-shift motor 31 (manual shift mode). At this time, the engine ECU 43 controls engine output, etc. in accordance with the shift signal fed from the transmission ECU 41 via the bus 42, etc.

That is, in the automatic shift mode, the transmission ECU 41 determines the necessity of gear shift on the basis of data regarding the running conditions such as vehicle speed and engine load. Further, in the manual shift mode, in response to a shift instruction from the driver, the transmission ECU 41 outputs a shift signal to thereby perform clutch disengagement control, gear shift control, and clutch engagement control. Irrespective of whether the shift mode is the automatic shift mode or the manual shift mode, the engine ECU 43 properly controls the output of the engine 1 during performance of the clutch disengagement, gear shift, and clutch engagement controls, on the basis of the shift signal output from the transmission ECU 41.

Figure 2:
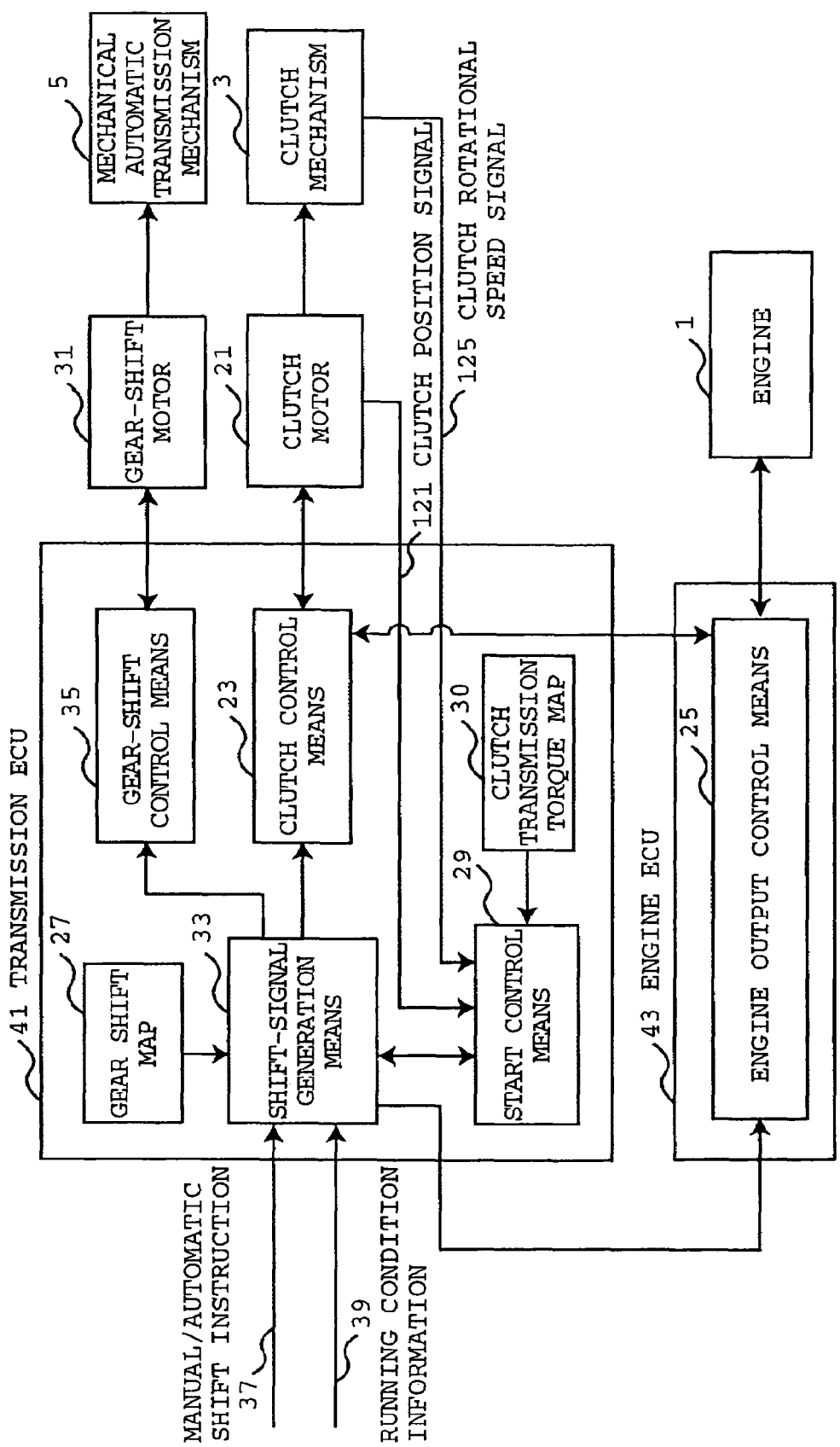
FIG. 2 is a functional block diagram of a mechanical-automatic-transmission control apparatus.

FIG. 2 is a functional block diagram of a mechanical-automatic-transmission control apparatus. As shown in FIG. 2, the mechanical-automatic-transmission control apparatus is composed of the transmission ECU 41 and the engine ECU 43.

The transmission ECU 41 includes shift-signal generation means 33, gear-shift control means 35, clutch control means 23, and start control means 29. These means are stored as programs in a storage device such as the ROM 415 of the transmission ECU 41. The transmission ECU 41 causes the CPU 411 to execute these programs so as to control automatic gear shift to thereby enable the vehicle to travel.

That is, the shift-signal generation means 33 selects a gear position. When gear shift is necessary, the shift-signal generation means 33 requests a shift operation. In response thereto, the clutch control means 23 generates a signal for bringing the clutch into a disengaged or engaged state, and controls the clutch motor 21 so as to activate the clutch mechanism 3. Meanwhile, in response to the shift request from the shift-signal generation means 33, the gear-shift control means 35 controls the gear-shift motor 31 so as to shift the mechanical automatic transmission mechanism 5 to the selected gear position. Further, the shift request (signal) from the shift-signal generation means 33 is also fed to the engine ECU 43 via the bus 42. Engine-output control means 25 in the engine ECU 43 controls the output of the engine 1 during gear shift while being interlocked with the clutch control means 23. This engine-output control means 25 is stored as a program in the ROM 435 of the engine ECU 43. The engine ECU 43 causes the CPU 431 to execute this program to thereby control the engine 1.

FIG. 2 will be described in more detail.

When the driver selects the manual shift mode or the automatic shift mode through operation of the change lever unit 13 while driving the vehicle, a manual/automatic shift instruction 37 is input to the shift-signal generation means 33. In the manual shift mode, a gear position is determined by an upshift or downshift request generated upon the driver's operation of the changer lever unit 13.

Meanwhile, when the manual/automatic shift instruction 37 indicates selection of the automatic shift mode, the shift-signal generation means 33 receives, as running condition information 39, signals such as the vehicle speed signal 129 and the accelerator opening signal 117, which are usually input via the input/output interface 417 of the transmission ECU 41, and determines a gear position on the basis of these pieces of information.

Figure 6:
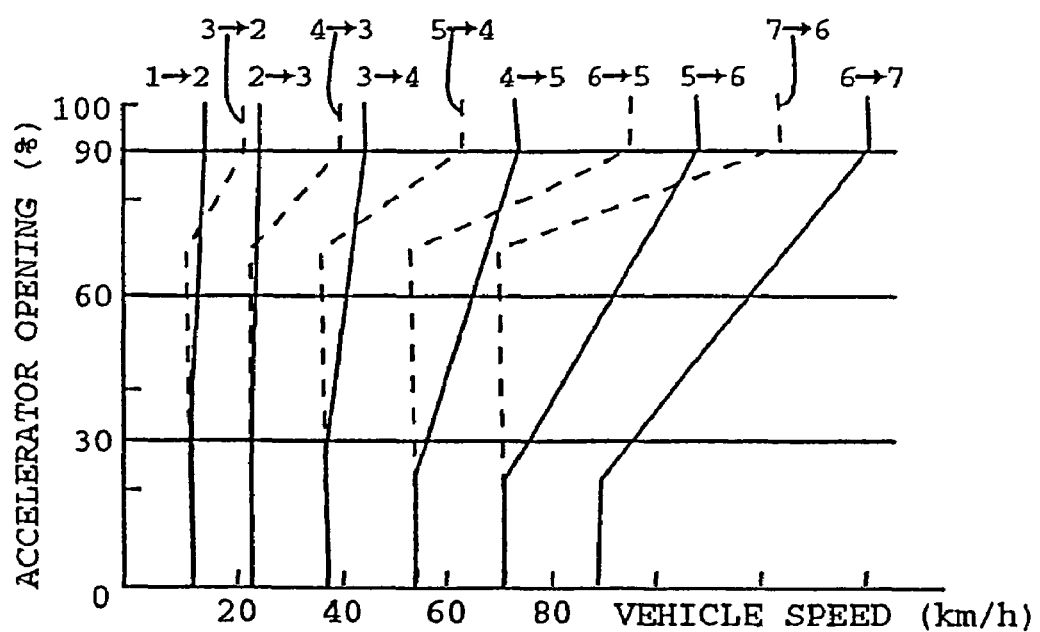
FIG. 6 is an explanatory chart showing a gear-shift map.

Specifically, a gear shift map 27 as shown in FIG. 6 is stored in the ROM 415 of the transmission ECU 41 in the form of, for example, a table. The shift-signal generation means 33 selects a gear position suitable for the present running conditions with reference to the table while using as keys the vehicle speed signal 129 and the accelerator opening signal 117, which are input to the shift-signal generation means 33 as the running condition information 39. Once a gear position is selected, the shift-signal generation means 33 feeds signals to the clutch control means 23, the gear-shift control means 35, and the engine-output control means 25 of the engine ECU 43, so as to control the clutch mechanism 3, the mechanical automatic transmission mechanism 5, and the engine 1, respectively, to thereby perform gear shift to the selected gear position.

Figure 3:
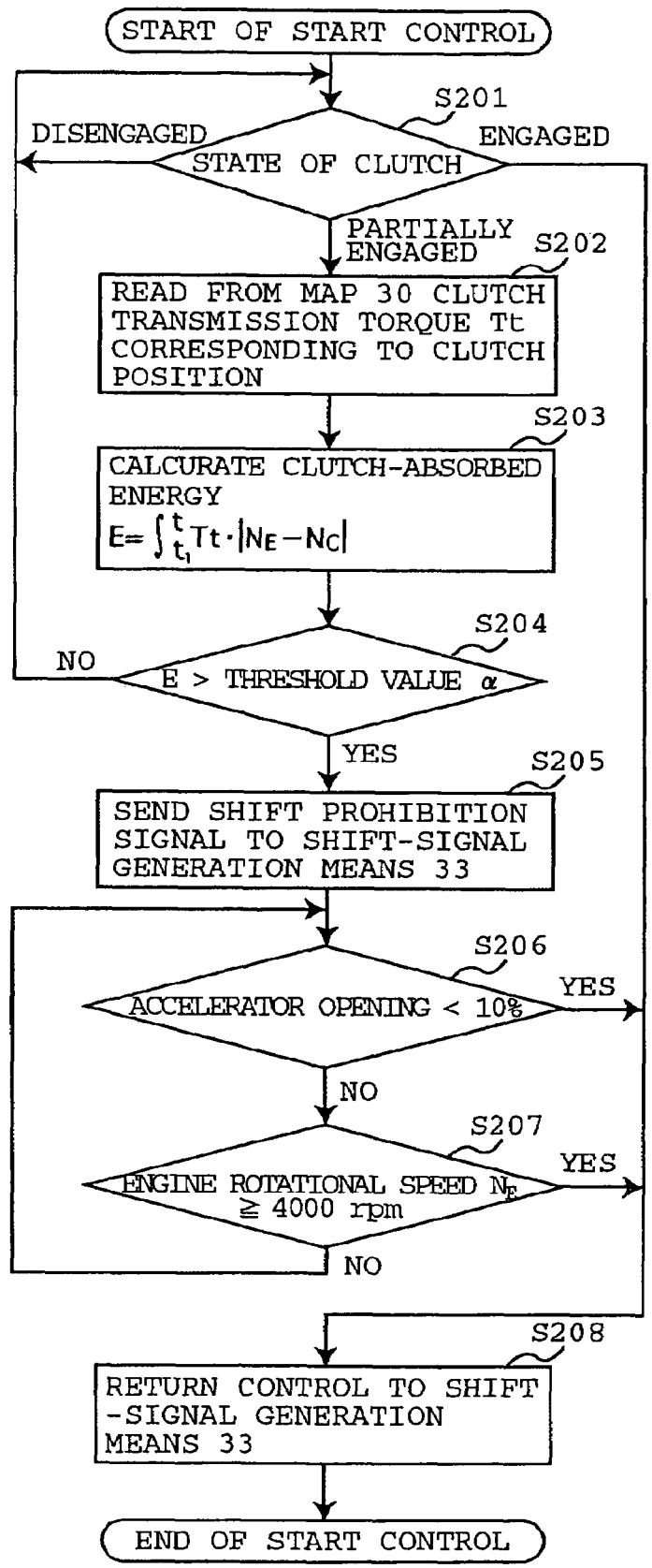
FIG. 3 is a flowchart showing the processing of start control.
Figure 4:
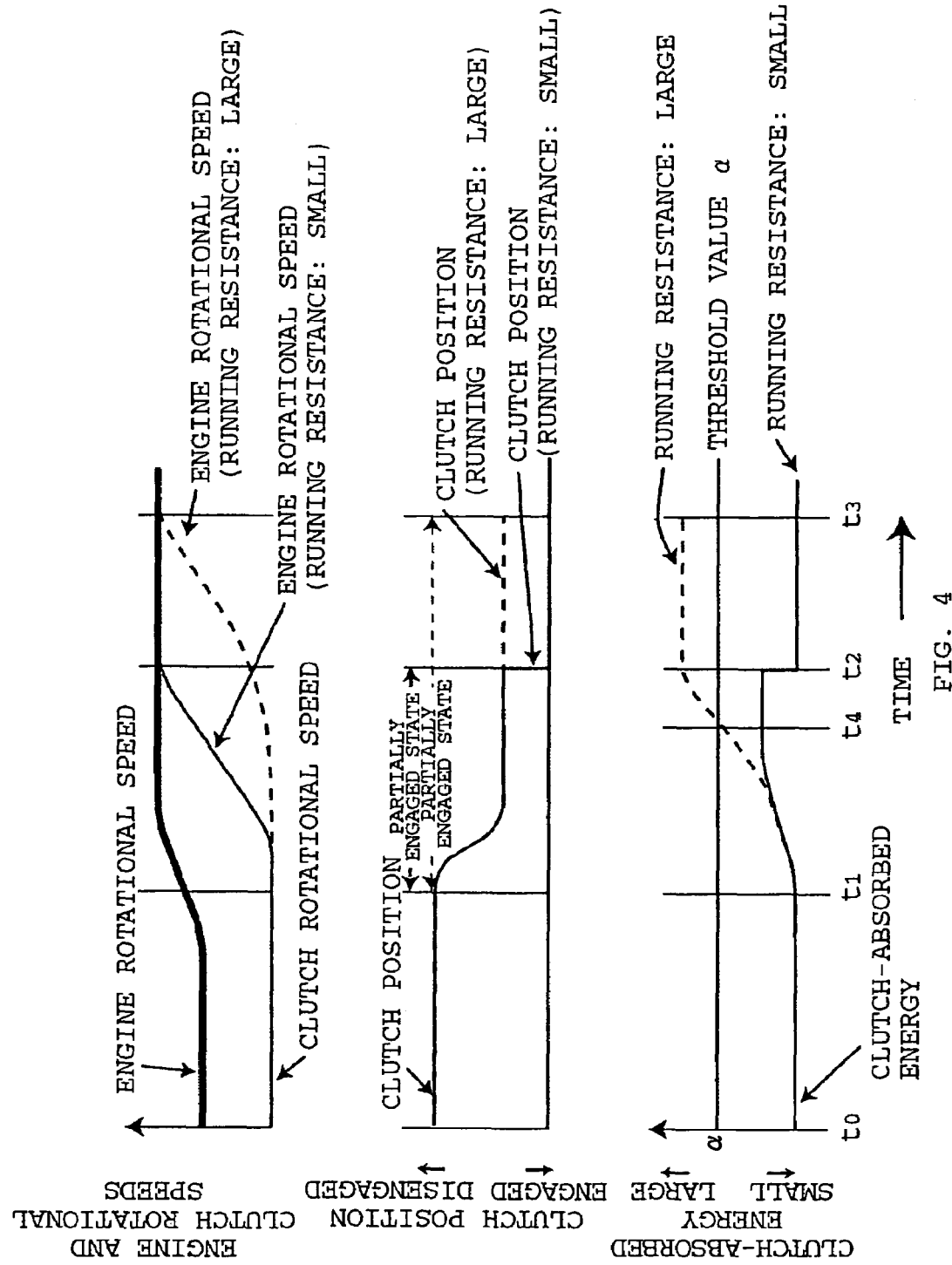
FIG. 4 is a time chart used for explaining running load at the time of start of the vehicle.

Next, there will be described gear shift control at the time of start of the vehicle according to the present embodiment. FIG. 3 is a flowchart showing the processing performed by means of the start control means 29. FIG. 4 is a time chart used for explaining running load at the time of start of the vehicle; specifically, showing changes with time in rotational speeds of the engine and the clutch, clutch position, and clutch-absorbed energy.

When the vehicle starts, the start control means 29 estimates a running load at the time of start on the basis of the clutch position signal 121, the clutch rotational speed signal 125, and the engine rotational speed signal 131 input to the transmission ECU 41. When the running load is large, the start control means 29 executes a control for prohibiting upshift of the gear position, and holding the gear position at the time of start.

The running load is estimated from load acting on the clutch mechanism 3, which is automatically controlled by the clutch control means 23 at the time of start. The load (clutch-absorbed energy) E acting on the clutch mechanism 3 is represented by the following equation:

$$E = \int T \cdot |N_E - N_C| \tag{1}$$

where T represents torque transmitted to the clutch, $N_E$ represents engine rotational speed, and $N_C$ represents clutch rotational speed. That is, the load E can be obtained by integrating the product of the clutch transmission torque T and the difference between the engine rotational speed $N_E$ and the clutch rotational speed $N_C$, over a time period in which the clutch is in a partially-engaged state.

Figure 5:
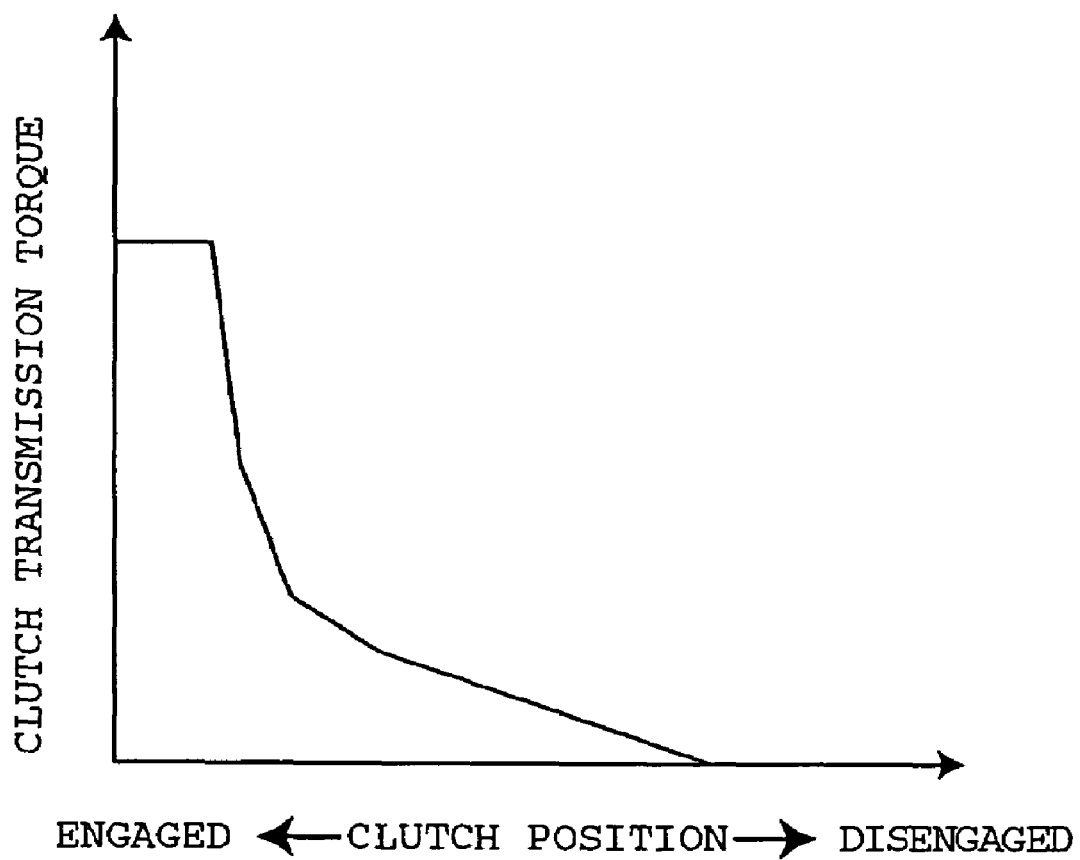
FIG. 5 is an explanatory graph showing a clutch transmission torque map.

The clutch transmission torque T in a partially-engaged state can be estimated from the clutch position. FIG. 5 is a graph showing the relation between clutch position and clutch transmission torque. When the clutch is in a completely engaged state, 100% the maximum clutch transmission torque is transmitted. The clutch transmission torque decreases as the clutch position approaches the disengaged position, and becomes zero at the disengaged position. The ROM 415 of the transmission ECU 41 stores a clutch transmission torque map 30 which represents the relation between the clutch position and the clutch transmission torque in the form of a table.

The processing of shift control at the time of start will be described with reference to the flowchart of FIG. 3.

First, the state of the clutch is determined on the basis of the clutch position signal 121 (S201). When the clutch is in a disengaged state ("disengaged" in S201), it is determined that vehicle starting operation has not yet been initiated, and the processing of S201 is repeated. This period corresponds to a period between time $t_0$ and time $t_1$ of FIG. 4.

When in S021 the clutch is determined to have entered a partially-engaged state ("partially engaged" in S201), processing for obtaining running resistance is performed (S202 and S203). That is, first, while the clutch position signal 121 input to the transmission ECU 41 via the input/output interface 417 is used as a key, the clutch transmission torque map 30 stored in the ROM 415 of the transmission ECU 41 is referred to so as to read a clutch transmission torque as $T_t$ (clutch transmission torque at time t) (S202). Next, the clutch-absorbed energy E is calculated in accordance with equation (1) (S203). Specifically, the difference between the engine rotational speed $N_E$ and the clutch rotational speed $N_C$ at time t is obtained from the engine rotational speed signal 131 and the clutch rotational speed signal 125 input to the transmission ECU 41 via the input/output interface 417, and the product of the difference and the clutch transmission torque $T_t$ is obtained. The product is integrated over a period between a time ($t=t_1$) at which the clutch entered the partially-engaged state and the present time t. Thus, the clutch-absorbed energy E at time t is obtained.

Subsequently, a determination is made as to whether the clutch-absorbed energy E is large; i.e., whether the running resistance is large (S204). Specifically, a determination is made as to whether the clutch-absorbed energy E is greater than a predetermined threshold value $\alpha$ (e.g., $\alpha$=40 kJ). When the clutch-absorbed energy E is greater than the threshold value $\alpha$ ("yes" in S204), the running resistance is determined to be large.

When the clutch enters the partially-engaged state at time $t_1$ as shown in FIG. 4, the clutch rotational speed gradually increases, and finally reaches the engine rotational speed. At this time, when the running resistance is small (solid line in FIG. 4), the clutch rotational speed increases rapidly, and reaches the engine rotational speed at, for example, time $t_2$. Meanwhile, when the running resistance is large (broken line in FIG. 4), the clutch rotational speed increases with a delay, and reaches the engine rotational speed at, for example, time $t_3$. In general, when the clutch rotational speed has reached the engine rotational speed (time $t_2$ or $t_3$), the clutch is brought into an engaged state.

Calculation of the clutch-absorbed energy E is started at time $t_1$ at which the clutch entered a partially-engaged state, and when the clutch-absorbed energy E is not greater than the threshold value $\alpha$ ("no" in S204), the processing flow returns to S201, and the above-described processing is repeated.

That is, as shown in the bottom section of FIG. 4, the clutch-absorbed energy E increases gradually after time $t_1$; however, even when the running resistance is large, the clutch-absorbed energy E does not exceed the threshold value $\alpha$ until time $t_4$. Therefore, in the period from time $t_1$ to $t_4$, the processing of S201 to S204 is repeatedly performed, so that the value of the clutch-absorbed energy E increases gradually.

When the clutch-absorbed energy E exceeds the threshold value $\alpha$ ("yes" in S204), the start control means 29 sends to the shift-signal generation means 33 a signal for prohibiting gear shift. Upon receipt of this signal, the shift-signal generation means 33 stops generation of a shift signal. That is, in the case where gear shift is performed by use of the gear shift map 27, the shift-signal generation means 33 does not generate a shift signal even when the vehicle speed and the accelerator opening reach respective values at which upshift is to be performed. Thus, the gear position at the time of start is held.

The gear position holding is continued until the accelerator opening becomes less than 10% or the engine rotational speed $N_E$ reaches 4000 rpm or higher (S206 and S207). Specifically, when the accelerator opening is 10% or greater ("no" in S206), the engine rotational speed $N_E$ is investigated. When the engine rotational speed $N_E$ is less than 4000 rpm ("no" in S207), the processing flow returns to S206, and the above-described processing is repeated.

When the accelerator opening becomes less than 10% ("yes" in S206) or the engine rotational speed $N_E$ becomes equal to or higher than 4000 rpm ("yes" in S207), the start control means 29 returns the control to the shift-signal generation means 33 (S208), and ends the start control processing. Thus, the shift-signal generation means 33 cancels the gear position holding, and performs gear shift control in accordance with the gear shift map 27.

Meanwhile, when the running resistance is small, the clutch-absorbed energy E does not exceed the threshold value a (solid line in the bottom section of FIG. 4), a "no" determination in S204 is repeated, and the processing of S201 to S204 is repeated until the clutch rotational speed reaches the engine rotational speed (until time $t_2$). When the clutch rotational speed reaches the engine rotational speed, the clutch mechanism 3 is controlled to an engaged state. As a result, in S201 the clutch is determined to be in an "engaged" state. As a result, the control is returned to the shift-signal generation means 33 (S208), and the start control processing is ended.

The above-described start control processing enables estimation of running resistance immediately after start, and when the running resistance is large, the gear position at the time of start can be held through prohibition of gear shift even when the vehicle reaches a vehicle speed at which gear shift is to be performed in accordance with the gear shift map 27.

As described above, since running resistance is estimated from load acting on the clutch during a partially engaged period after start of the vehicle, estimation of running resistance immediately after start becomes possible without requiring dedicated means, such as sensors, for detecting running resistance, and when the running resistance immediately after start is large, the gear position can be held for a predetermined period of time through prohibition of upshift.

By virtue of the above-described configuration, as compared with a conventional apparatus in which upshift after start is prohibited by use of running resistance estimated from acceleration and engine torque during traveling, the apparatus of the present invention can quickly estimate running resistance, and can more reliably prevent gear position hunting at the time of start, to thereby prevent deterioration in drive feeling.

The larger the load acting on the clutch at the time of start, the larger the load (i.e., running resistance) acting on the vehicle traveling on a steep uphill or carrying a heavy load. Therefore, the running resistance can be estimated by calculating the load acting on the clutch as clutch-absorbed energy, which is obtained through integration of the product of the clutch transmission torque and the difference between the engine rotational speed and the clutch rotational speed.

Since the clutch transmission torque is obtained from the clutch position with reference to a map showing the relation between the clutch position and the clutch transmission torque, obtaining the clutch transmission torque does not require a complicated control logic, and the clutch transmission torque can be obtained more quickly. As a result, running resistance immediately after start can be estimated quickly, and unnecessary upshift can be prohibited more reliably.

Notably, the present invention is not limited to the above-described embodiment, various modifications thereof are possible, and these modifications fall within the technical scope of the present invention. For example, in the above-described embodiment, the threshold value a of the clutch-absorbed energy E is 40 kJ; however, the threshold value $\alpha$ is not limited to this value, and may be previously determined to a different value through measurement or any other suitable method. Further, in the above-described embodiment, an accelerator opening of 10% and an engine rotational speed of 4000 rpm serve as criteria for determining a time at which the gear shift control is returned to the shift-signal generation means 33; however, these values are mere examples, and the accelerator opening and the engine rotational speed serving as criteria are not limited thereto. The accelerator opening and the engine rotational speed serving as criteria may be previously set to predetermined values, and stored in the ROM 415 of the transmission ECU 41.

What is claimed is:

1. A mechanical automatic transmission apparatus for a vehicle comprising:
    an engine;
    a transmission for outputting drive force to an output system of the vehicle;
    a clutch interposed between the engine and the transmission and selectively transmitting drive force from the engine to the transmission;
    an operating condition detection element for detecting operating conditions of the vehicle;
    a gear shift map storing target gear positions determined on the basis of the operating conditions of the vehicle;
    a gear shift control element for activating the clutch and the transmission so as to perform gear shift, when a different target gear position is selected from the gear shift map on the basis of the operating conditions of the vehicle detected by the operating condition detection element;
    a clutch load detection element for detecting load acting on the clutch; and
    a running resistance estimation element for estimating running resistance acting on the vehicle at the time of start of the vehicle from the load which acts on the clutch during a partially engaged period after start of the vehicle and which is detected by the clutch load detection element, wherein
    the gear shift control element prohibits gear shift and holds an initial gear position when the running resistance estimated by the running resistance estimation element is greater than a predetermined value.

2. A mechanical automatic transmission apparatus according to claim 1, wherein the clutch load detection element calculates the load acting on the clutch by integrating the product of clutch transmission torque and the difference between rotational speed of the engine and rotational speed of the clutch.

3. A mechanical automatic transmission apparatus according to claim 2, wherein the clutch load detection element obtains the clutch transmission torque from a clutch position with reference to a map which defines the relation between clutch position and clutch transmission torque.

* * * * *